US008773364B2

(12) United States Patent
Adenau et al.

(10) Patent No.: US 8,773,364 B2

(45) Date of Patent: Jul. 8, 2014

(54) METHOD FOR OPERATING A LIGHTING CONTROL CONSOLE DURING COLOR SELECTION

(75) Inventors: Michael Adenau, Würzburg (DE); Hartmut Cordes, Bremen (DE)

(73) Assignee: MA Lighting Technology GmbH (DE)

( * ) Notice: Subject to any disclaimer, the term of this patent is extended or adjusted under 35 U.S.C. 154(b) by 1053 days.

(21) Appl. No.: 12/488,969

(22) Filed: Jun. 22, 2009

(65) Prior Publication Data

US 2010/0321306 A1 Dec. 23, 2010

(51) Int. Cl.
*G06F 3/041* (2006.01)
*G06K 9/74* (2006.01)

(52) U.S. Cl.
USPC .............. 345/173; 345/63; 382/212; 382/283

(58) Field of Classification Search
USPC ........................................... 345/173; 315/292
See application file for complete search history.

(56) References Cited

U.S. PATENT DOCUMENTS 5,307,295 A * 4/1994 Taylor et al. ...................... 703/1
5,668,537 A * 9/1997 Chansky et al. ............... 340/3.7
6,504,551 B1 * 1/2003 Takashima et al. ........... 345/649
7,283,277 B2 * 10/2007 Li ................................ 358/1.18
7,995,040 B2 * 8/2011 Adenau ......................... 345/173
2004/0021689 A1 * 2/2004 Parker et al. .................. 345/771
2006/0158461 A1 * 7/2006 Reese et al. .................... 345/620
2006/0167572 A1 * 7/2006 Fluss ................................ 700/83
2007/0103447 A1 * 5/2007 Varian et al. .................. 345/173
2008/0012849 A1 * 1/2008 Snyder et al. ................. 345/418
2008/0084429 A1 * 4/2008 Wissinger ...................... 345/640
2009/0140667 A1 * 6/2009 Adenau .......................... 315/292
2010/0238127 A1 * 9/2010 Adenau et al. ................ 345/173

OTHER PUBLICATIONS

Vir-Lite, inc.; Virtuoso/ Virtuoso DX console User's Manual; Sep. 23, 2002, Virtuoso console software version 4.2., p. 6, 8, 21, 41, 89-99, 319-336, 359 and 363, 367-368.*

* cited by examiner

*Primary Examiner* — Joe H Cheng
*Assistant Examiner* — Benyam Ketema
(74) *Attorney, Agent, or Firm* — Quarles & Brady LLP

(57) ABSTRACT

The invention relates to a method for operating a lighting control console for controlling a lighting system. The console provides a digital processor and memory for generating, managing and storing the adjusting commands. The console also includes a display device and a color palette, including all selectable colors consecutively displayed as color gradients, for selecting a color to be graphically represented at the display device for the user. The display device has a touch-sensitive sensor surface, such that when touching the same within the region of a contact surface, the user can select the digital color parameters of a color from the displayed color palette. The console facilitates the selection of a digital color image and allows the user to select pixels of the color image by touching the touch-sensitive sensor surface. The console further processes color parameter combinations of the pixels selected by the user.

18 Claims, 4 Drawing Sheets

METHOD FOR OPERATING A LIGHTING CONTROL CONSOLE DURING COLOR SELECTION

The present invention relates to a method for operating a lighting control console according to the preamble of claim 1.

Generic lighting control consoles serve the purpose of controlling lighting systems, such as they are for instance used in theaters and/or on concert stages. These lighting systems normally include a plurality of lighting devices, such as stage spotlights, wherein the lighting devices can, in turn, themselves be switched between a large variety of lighting states, in particular different colors. These various lighting devices with their different lighting states are controlled in the lighting program of the lighting control console by means of programmed parameters. Conventional lighting systems can thereby comprise as many as several thousands of lighting devices. In order to be able to control any such complex lighting systems, generic lighting control consoles are equipped with a digital processor, which allows for a digital data and signal processing. In order to be able to store the data, provision is furthermore made for a digital memory, which makes it possible in particular to archive lighting programs. In order to be able to program and control the lighting system, it is frequently necessary to select at the lighting control console specific colors, such as the lighting color of a certain stage spotlight. In order to facilitate said color selection, the generic lighting control consoles are furnished with display devices comprising a touch-sensitive sensor surface, wherein a color palette can be displayed at this display device. By means of touching a specific spot on said color palette, the user is subsequently enabled to readily select the color parameters of the color displayed on this spot. The color palettes are designed as two-dimensional surfaces, wherein all selectable colors are consecutively displayed as color gradients on the two-dimensional representation surface.

The known color selection, which is performed by selecting a specific pixel on the color palette, is in many applications afflicted with drawbacks as regards operating comfort. This is the result of the fact that in some applications, the color to be selected is predetermined by the color of a pixel or an image region in a predetermined color image. If the user wants to subsequently set this predetermined color from the color image at the lighting control device, the user has to read the alphanumerical values of the color parameters within this pixel and within this image region respectively and to select the same by selecting a pixel in the color palette. Making the proper selection of the corresponding color pixel in the color palette thus proves to be extremely difficult, since all colors are represented in the color palette.

Consequently, it is the object of the present invention to propose a method by means of which the color selection of the color parameters can be facilitated in case of predetermined color parameters from a color image.

This object is attained by means of a method according to the teaching of claim 1.

Advantageous embodiments of the invention form the subject-matter of the subordinate claims.

According to the inventive method, in a first step, the digital color image, which is intended to serve as the basis for the subsequently performed color selection for controlling the lighting control console, is selected. The image content of this color image is thereby formed by a plurality of pixels, wherein the colors of each pixel are specified by a combination of color parameters.

Subsequently, the selected color image is displayed at the display device, at which the conventional color palette is otherwise displayed for the color selection. This means in other words that the color palette is replaced by a color image with a specific image content. Then, the selection of a pixel of the color image is performed by touching the touch-sensitive sensor surface, such that the user is provided with the option to select a specific color from the displayed color image in a completely intuitive fashion. The color parameters of the at least one pixel that has been selected are subsequently transferred as a combination for further processing.

As a result, for performing the color selection in correspondence with the colors of a predetermined color image, the user is in the inventive method no longer required to firstly perform the cumbersome steps of reading the color parameters of a color in the color image and subsequently entering the same at the color palette. Instead, the user is provided with an illustration of the color image itself at the display device, and the color parameters are selected by means of simply touching a pixel of the digital color image. This makes it possible that the operating steps can be performed in a highly intuitive fashion.

According to a preferred method variant, it is not only one individual pixel that is selected for the color selection but a two-dimensionally coherent pixel region, which consists of several pixels that are displayed on the display device. This pixel region is selected by correspondingly touching the sensor surface, and the color parameters of the selected pixels are subsequently integrated in order to derive therefrom the combination of color parameters which is provided for further processing.

In particular, an average value of the color parameters can be derived from the color parameters of the selected pixel region and can be transferred for further processing.

In many applications, it is besides desirable that not only one specific individual color is selected, but rather a specific color region. This selection of a color region is rendered possible by means of converting the selected combination of color parameters into a color parameter region during further processing. The previously selected specific color value thereby serves as the starting point for computing the color parameter region, whereby the corresponding color parameters are subsequently converted into the desired color parameter region by addition and subtraction respectively of tolerance values.

It is generally optional in which way the color image forming the basis of the color selection is selected. According to a preferred method variant, a color image can by selected to this end from a color film sequence. In this way, the colors contained in a color film can be readily used by the user for the color selection as well.

The inventive method offers great advantages if the lighting control console is interconnected with a so-called media server, which controls the image output at a display device, for instance at an image projector. According to this method variant, the color image is subsequently transferred from the media server to the lighting control console for the color selection at the lighting control console, and is there displayed at the display device for the color selection. In this way, the user is enabled to rapidly and intuitively select such a color for the operation of the lighting control console that exactly corresponds to the color that is likewise contained in the corresponding image of the media server. Any cumbersome transfer of the corresponding color parameters from the media server to the lighting control console can in this way be omitted.

According to another refinement of the inventive method, by means of interconnecting the lighting control console with a media server provision is made for subsequently using the selected combination of color parameters for manipulating the image output of the media server at the display device.

This manipulation of the image output of the media server at the display device can for instance be performed by transparently masking all pixels which have color parameters that correspond to the combination of color parameters and color parameter regions respectively which have been selected by the user in the color image.

As an alternative to the transparent masking of all pixels which have color parameters that correspond to the selected combination of color parameters, it is likewise possible to perform a color shift at said pixels. This means in other words that the selected color is shifted by a specific color value in order to thus correspondingly modify the image presentation of the displayed image.

It is generally optional in which color code system the inventive method operates and will depend on the respective application. It is especially suitable to make use of an RGB color code system, wherein the colors are specified as a combination of color parameters in the color values RED, GREEN and BLUE.

Various aspects of the invention are schematically illustrated in the drawings and will be described below in an exemplary manner, wherein.

Figure 1:
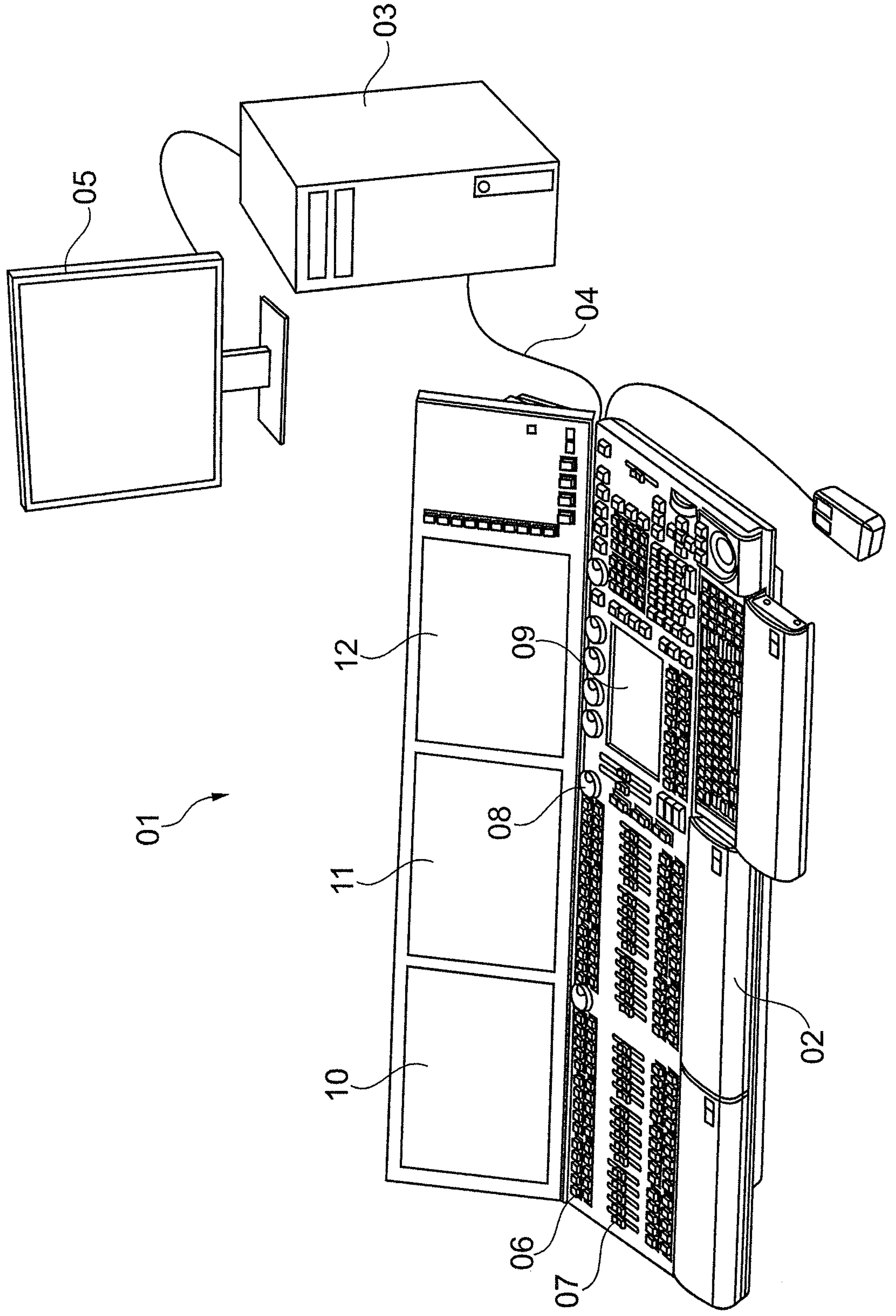
FIG. 1 shows a system comprising a lighting control console and a media server in a perspective view.

FIG. 1 shows a system 01 composed of a lighting control console 02 and a media server 03. The lighting control console 02 and the media server 03 are interconnected by means of a data line 04, thus enabling data exchange. Furthermore, a display device 05, such as a color display or a digital projector, is connected to the media server 03 in order to enable displaying of the color images computed on the media server 03.

A plurality of operating elements, namely keys 06, slide controls 07 and rotary controls 08, are provided at the lighting control console 02 in order to enable the user to input operating commands. In order to facilitate the selection of colors, the lighting control console 02 is additionally equipped with a touch-sensitive display device 09. Color images, which are composed of a plurality of color pixels, can be displayed at this touch-sensitive display device 09. By means of touching one of said color pixels, the combination of the color parameters of this specific pixel can be selected and chosen for further processing.

Figure 2:
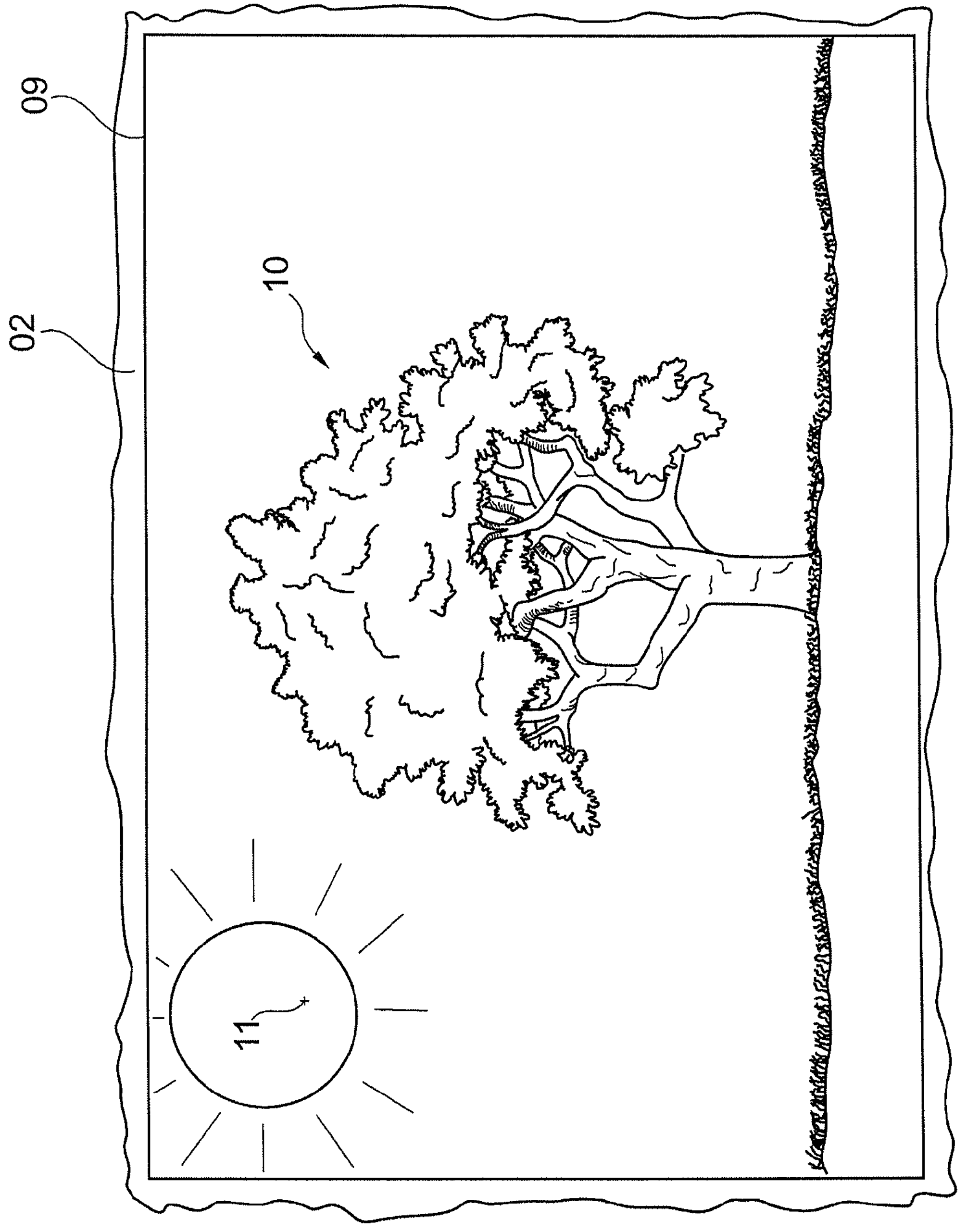
FIG. 2 shows the display device of the lighting control console according to FIG. 1 when a digital color image is displayed for the selection of a color.

FIG. 2 shows the display device 09 of the lighting control console 02 when a digital color image 10 is displayed. The digital color image 10 was beforehand transferred from the media server 03 to the lighting control console 02 and illustrates a specific image content, namely a tree and a sun, as a combination of a plurality of color pixels. After displaying of the digital color image 10 at the display device 09, the user is enabled to for instance select a pixel 11 of the color image 10 that has a specific color by means of touching the touch-sensitive surface of the display device 09.

Figure 3:
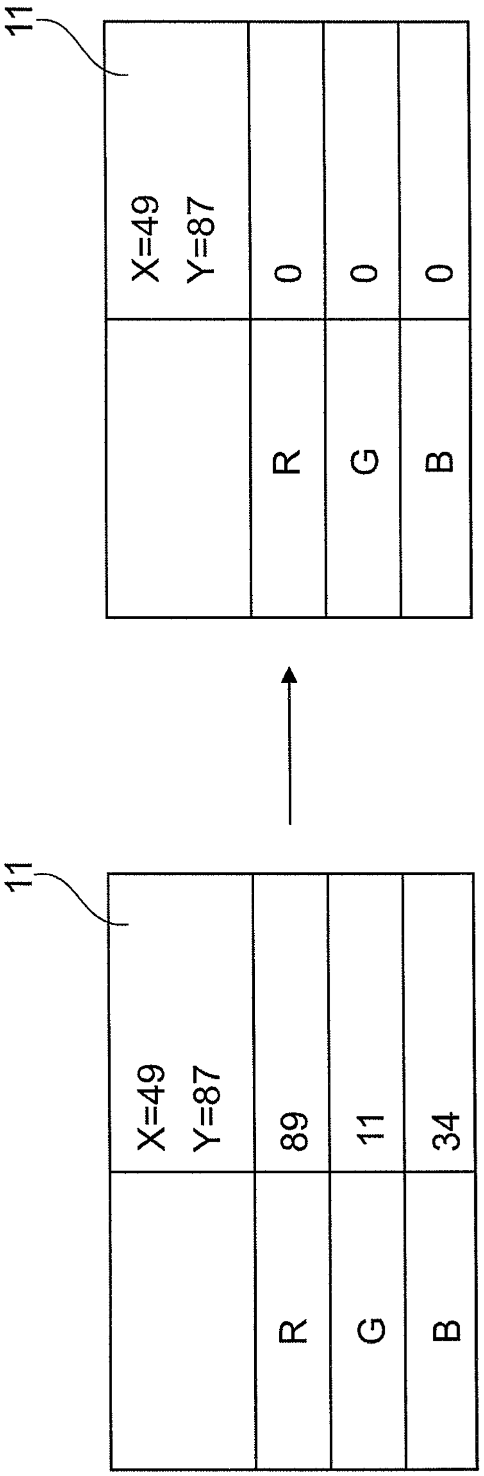
FIG. 3 shows the conversion of the color parameter combination of a pixel.

FIG. 3 shows, on the left-hand side, the combination of the color parameters RED, GREEN and BLUE of the pixel 11, which is defined by means of its X-Y coordinates. In the described example, the pixel 11 is defined by the RGB values 89, 11 and 34. Subsequently, all pixels which have the same combination of the RGB values as the pixel 11 within a specific region of tolerance can be selected in the digital color image 10 by means of performing suitable data processing steps. Then, all these pixels and in particular likewise the pixel 11, as is exemplarily shown in FIG. 3 on the right-hand side, are set to the RGB value combination 000, which is supposed to correspond to a transparent representation.

Figure 4:
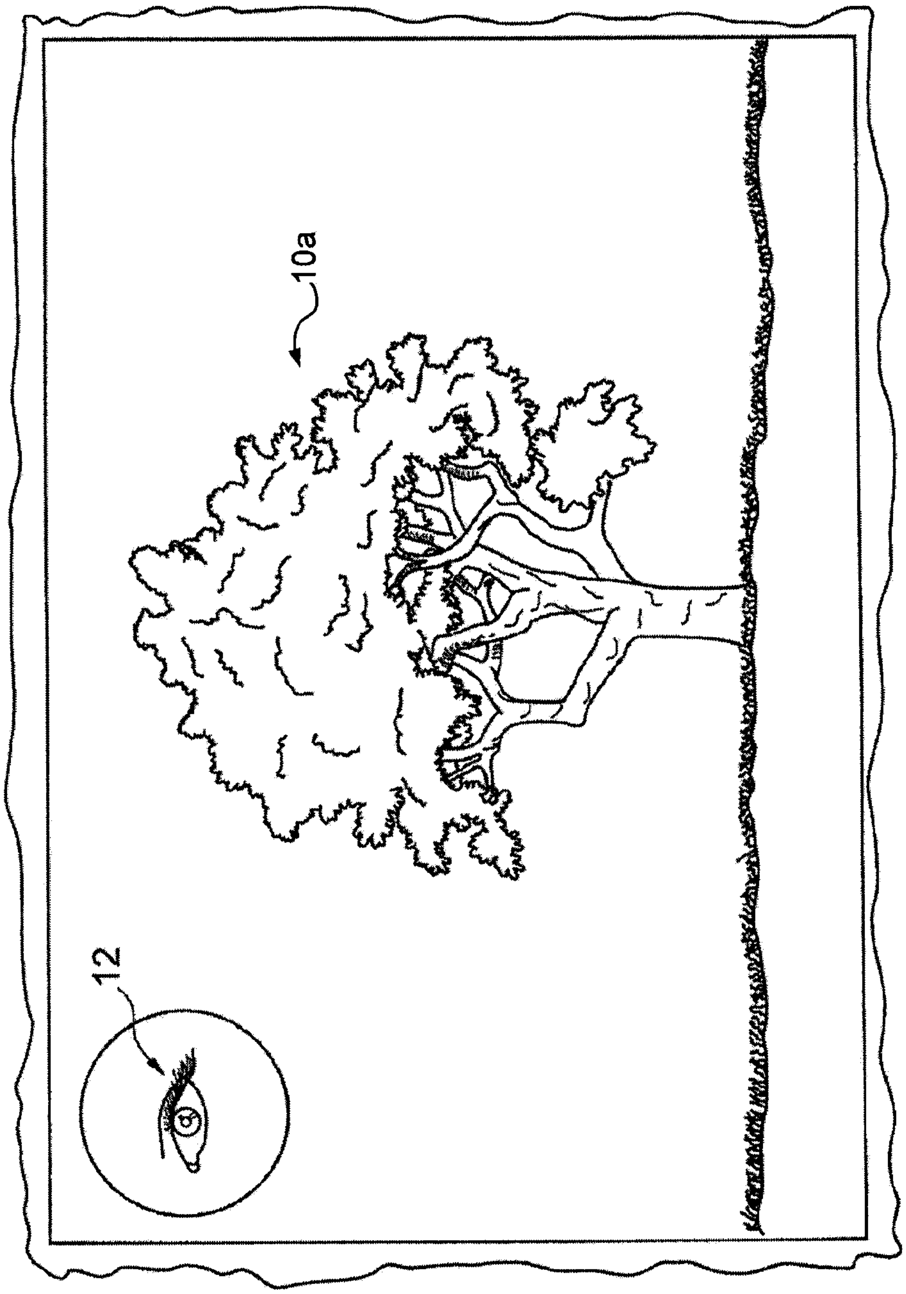
FIG. 4 shows the display device according to FIG. 2 after manipulation of the selected color pixels.

FIG. 4 shows the digital color image 10*a* after the transparent masking of all pixels which have RGB value combinations that correspond to the RGB value combination of the pixel 11. As a result, the image region for illustrating the sun in the color image 10*a* becomes transparent by means of the transparent masking, such that an image section of a color image 12 that is superimposed at the back of the color image 10*a* in a second image plane, which is in the example illustrated in FIG. 4 represented by an eye, becomes visible.

The invention claimed is:

1. A method for operating a lighting control console for controlling a lighting system comprising the following steps:

a) providing a lighting control console comprising at least one digital processor and at least one digital memory for generating, managing and storing the adjusting commands, wherein the lighting control console includes at least one display device, and wherein a color palette for the selection of a color can be graphically represented at the display device for the user, said color palette being all selectable colors consecutively displayed as color gradients, and wherein the display device has a touch-sensitive sensor surface, which by touching the touch-sensitive sensor surface allows for the selection of digital color parameters of a color from the displayed color palette;

b) selecting a digital color image, wherein the image content is formed by a plurality of pixels, and wherein the color of each pixel is specified by a combination of color parameters, wherein said digital color image does not form part of the color palette;

c) displaying the selected color image at the display device;

d) selecting several pixels of the color image not forming part of the color palette by touching the touch-sensitive sensor surface, wherein the several pixels of the color image including a two-dimensionally coherent pixel region are selected in the touch-sensitive sensor surface, wherein the color parameters of the several pixels are integrated and converted into the combination of color parameters which is provided for further processing; and e) further processing the combination of color parameters of the several pixels of the color image selected by touching the touch-sensitive sensor surface, wherein for the image output at the display device, all pixels which have color parameters that correspond to the combination of color parameters or color parameter regions provided for further processing are transparently masked.

2. The method according to claim 1, wherein the combination of color parameters which is provided for further processing is computed as an average value of the color parameters of the selected pixels.

3. The method according to claim 2, wherein a color parameter region is formed during further processing of the selected combination of color parameters, which color parameter region is the result of the addition and/or subtraction of a tolerance value with the selected color parameter.

4. The method according to claim 2, wherein the color image is selected from a color film sequence.

5. The method according to claim 1, wherein a color parameter region is formed during further processing of the selected combination of color parameters, which color parameter region is the result of the addition and/or subtraction of a tolerance value with the selected color parameter.

6. The method according to claim 1, wherein the color image is selected from a color film sequence.

7. The method according to claim 1, wherein the color image is selected from a color film sequence.

8. The method according to claim 1, wherein the color image is absorbed by a media server, which is connected to the lighting control console and which controls the image output of a display device by data-based processing of the color images.

9. The method according to claim 1, wherein the color image is absorbed by a media server, which is connected to the lighting control console and which controls the image output of a display device by data-based processing of the color images.

10. The method according to claim 1, wherein the combination of color parameters which is provided for further processing is transferred to the media server, which is connected to the lighting control console to control the image output of the display device.

11. The method according to claim 1, wherein the combination of color parameters which is provided for further processing is transferred to the media server, which is connected to the lighting control console to control the image output of the display device.

12. The method according to claim 1, wherein for the image output at the display device all pixels which have color parameters that correspond to the combination of color parameters or color parameter regions provided for further processing are transparently masked.

13. The method according to claim 1, wherein for the image output at the display device all pixels are shifted in the color which has color parameters that correspond to the combination of color parameters or color parameter regions provided for further processing.

14. The method according to claim 1, wherein for the image output at the display device all pixels are shifted in the color which has color parameters that correspond to the combination of color parameters or color parameter regions provided for further processing.

15. The method according to claim 1, wherein the combination of color parameters which is provided for further processing specifies the color values of RED, GREEN and BLUE of an RGB color code system.

16. The method according to claim 1, wherein the combination of color parameters which is provided for further processing specifies the color values of RED, GREEN and BLUE of an RGB color code system.

17. A method for operating a lighting control console for controlling a lighting system comprising the following steps:

a) providing a lighting control console comprising at least one digital processor and at least one digital memory for generating, managing and storing the adjusting commands, wherein the lighting control console includes at least one display device, and wherein a color palette for the selection of a color can be graphically represented at the display device for the user, said color palette being all selectable colors consecutively displayed as color gradients, and wherein the display device has a touch-sensitive sensor surface, which by touching the touch-sensitive sensor surface allows for the selection of digital color parameters of a color from the displayed color palette;

b) selecting a digital color image, wherein the image content is formed by a plurality of pixels, and wherein the color of each pixel is specified by a combination of color parameters, wherein said digital color image does not form part of the color palette;

c) displaying the selected color image at the display device;

d) selecting several pixels of the color image not forming part of the color palette by touching the touch-sensitive sensor surface; and e) further processing the combination of color parameters of the several pixels of the color image selected by touching the touch-sensitive sensor surface, wherein for the image output at the display device, all pixels which have color parameters that correspond to the combination of color parameters or color parameter regions provided for further processing are transparently masked, wherein a color parameter region is formed during further processing of the selected combination of color parameters, which color parameter region is the result of the addition and/or subtraction of a tolerance value with the selected color parameter.

18. The method according to claim 17, wherein the color image is selected from a color film sequence.

* * * * *